Nov. 11, 1924.
O. N. WISWELL
SWINGSPOUT MEASURE
Filed Sept. 18, 1923
1,514,945
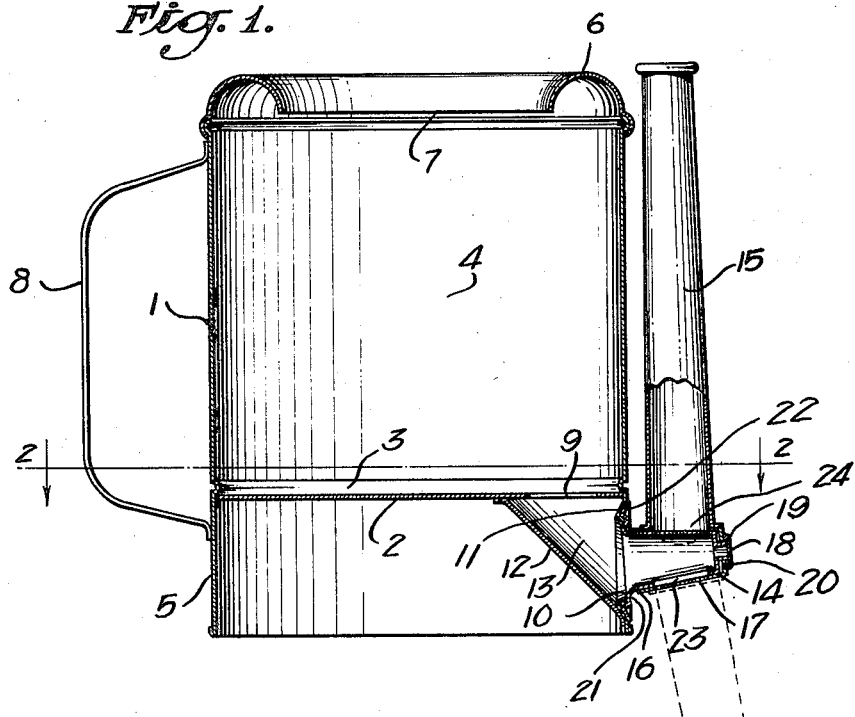
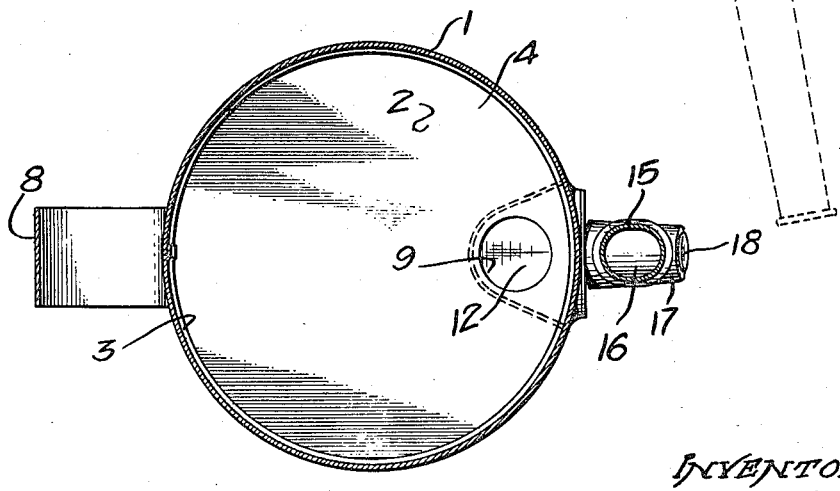
INVENTOR:
OZRO N. WISWELL,
BY
Graham & Lauri
ATTORNEYS.

Patented Nov. 11, 1924.

1,514,945

UNITED STATES PATENT OFFICE.

OZRO N. WISWELL, OF LOS ANGELES, CALIFORNIA, ASSIGNOR TO SWINGSPOUT MEASURE CO., A CORPORATION OF CALIFORNIA.

SWINGSPOUT MEASURE.

Application filed September 18, 1923. Serial No. 663,394.

*To all whom it may concern:*

Be it known that I, OZRO N. WISWELL, a citizen of the United States, residing at Los Angeles, in the county of Los Angeles, State of California, have invented a new and useful Swingspout Measure, of which the following is a specification.

My invention relates to swingspout measures, particularly useful as an oil measure at oil service stations for filling automobile crank case oil reservoirs.

The object in general of my invention is to provide a swingspout measure constructed with a false bottom and a false rim below said bottom, which bottom and rim are respectively provided with outlets connected by a conduit, to which rim outlet is connected, outside of said rim, a spout-operated controlling valve adapted to be closed when the spout is swung into its upwardly extended position to retain a liquid within the measure and opened when the spout is swung into its downwardly extended position to allow the liquid to flow out of the measure through said spout.

Other objects and advantages will be made evident hereinafter.

Referring to the drawing which is for illustrative purposes only,

Fig. 1 is a vertical longitudinal section of my invention.

Fig. 2 is a horizontal section of my invention taken on line 2—2 of Fig. 1.

In the drawing, 1 indicates a casing open at upper and lower ends, in which casing is secured a false bottom 2 against the underside of an internal annular bead 3 formed in said casing, a measuring receptacle 4 being formed in said casing above said false bottom and a false rim 5 being formed by said casing below said bottom. The upper end 6 of the casing 1 is arched inwardly to form a measuring edge 7 below the top of the casing. To the rear of the casing is secured a handle 8. The false bottom 2 is provided with an outlet 9 near the front of the measuring receptacle 4, and the false rim 5 is provided with an opening 10 in the front thereof. The rim 5 is formed with an inwardly extending V-shaped annular bead 11 around the opening 10. A single piece of metal 12 is secured at its edges to the underside of the false bottom 2 and to the inside of the false rim 5 around the outside of the outlets 9 and 10, forming a conduit 13 which communicates with said outlets. A conical valve 14 is mounted on the outside of the false rim 5 in communication with the outlet 10 and carries a tapered swinging spout 15, said valve controlling communication between the outlet 10 and said spout. Said valve 14 comprises a pair of telescoping conical shell members 16 and 17, the member 17 telescoping upon the member 16, and the member 16 forming a seat for the member 17 to turn upon. The member 16 is formed with a hollow stud 18 on its outer forward end wall, which stud projects through an aperture 19 in the forward end wall of the member 17, and said stud is turned over at its outer end, as indicated at 20, against the front end wall of the member 17, whereby the member 17 is turnably retained on the member 16. The member 16 is formed at its base with an external flange 21, in which flange is formed a V-shaped annular bead 22, which rests within and is secured to the annular bead 11 in the false rim 5, whereby the valve 14 is mounted on said rim in axial alignment with the opening 10. The valve member 16 is provided with a port 23 in its lower side. The outer member 17 is provided with a port 24 and the spout 15 is secured at its larger end to the member 17 in communication with said port.

Normally the spout 15 rests in an upwardly extended position, in which position the port 24 is over the upper wall of the member 16 and is closed by said wall, while the lower side of the member 17 rests under the port 23 and closes said port, thus closing the valve so that no oil may pass out of the measuring receptacle 4 through the conduit 13, valve 14 and spout 15. The measuring receptacle 4 is filled with oil, which oil fills up the conduit 13 and the inner valve member 16 until the level of the oil coincides with the edge 7 which measures a definite amount of oil such as a quart. Upon turning the spout 15 downwardly 180 degrees into the position shown in dotted lines, the port 24 is brought into registration with the port 23, whereby the valve is opened and the oil from the measuring receptacle 4 flows out through conduit 13, valve member 16, said ports and the spout 15 into an oil inlet into which said spout may be inserted.

I claim as my invention:

1. A swingspout measure comprising: a casing; a bottom secured in said casing and forming a measuring receptacle thereabove; a rim forming an extension of said casing below said bottom, said rim and said bottom having openings therein; a conduit connecting said openings together; and a swinging spout communicating with the opening in said rim, said swinging spout being at all times entirely outside said rim.

2. A swingspout measure comprising: a casing; a bottom secured in said casing and forming a measuring receptacle thereabove; a rim forming an extension of said casing below said bottom, said rim and said bottom having openings therein; a conduit connecting said openings together; a valve member mounted on the outside of said rim over the opening therein; and a swinging spout mounted on and turning about said valve member.

3. A swingspout measure comprising: a casing; a bottom secured in said casing and forming a measuring receptacle thereabove; a rim forming an extension of said casing below said bottom, said rim and said bottom having openings therein; an imperforate piece of metal forming a continuous conduit connecting said openings together; and a swinging spout communicating with the opening in said rim, said swinging spout being at all times entirely outside said rim.

4. A swingspout measure comprising: a casing; a bottom secured in said casing and forming a measuring receptacle thereabove: a rim forming an extension of said casing below said bottom, said rim and said bottom having openings therein; an imperforate piece of metal forming a continuous conduit connecting said openings together; a valve member mounted on the outside of said rim over the opening therein; and a swinging spout mounted on and turning about said valve member.

5. A swingspout measure comprising: a casing; a bottom secured in said casing and forming a measuring receptacle thereabove; a rim forming an extension of said casing below said bottom, said rim and said bottom having openings therein; a conduit connecting said openings together; a valve member mounted on the outside of said rim over the opening therein; and a swinging spout mounted on and turning about said valve member, said valve and spout having coacting openings so placed as to provide an open communication between said valve and said spout when said spout is at or near its downwardly extending position.

6. A swingspout measure comprising: a casing; a bottom secured in said casing and forming a measuring receptacle thereabove; a rim forming an extension of said casing below said bottom, said rim and said bottom having openings therein; an imperforate piece of metal forming a continuous conduit connecting said openings together; a valve member mounted on the outside of said rim over the opening therein; and a swinging spout mounted on and turning about said valve member, said valve and spout having coacting openings so placed as to provide an open communication between said valve and said spout when said spout is at or near its downwardly extending position.

In testimony whereof, I have hereunto set my hand at Los Angeles, California, this 12th day of September 1923.

OZRO N. WISWELL.